May 30, 1944.  R. W. PATON  2,350,064
PISTON EXPANDER
Filed Nov. 2, 1942
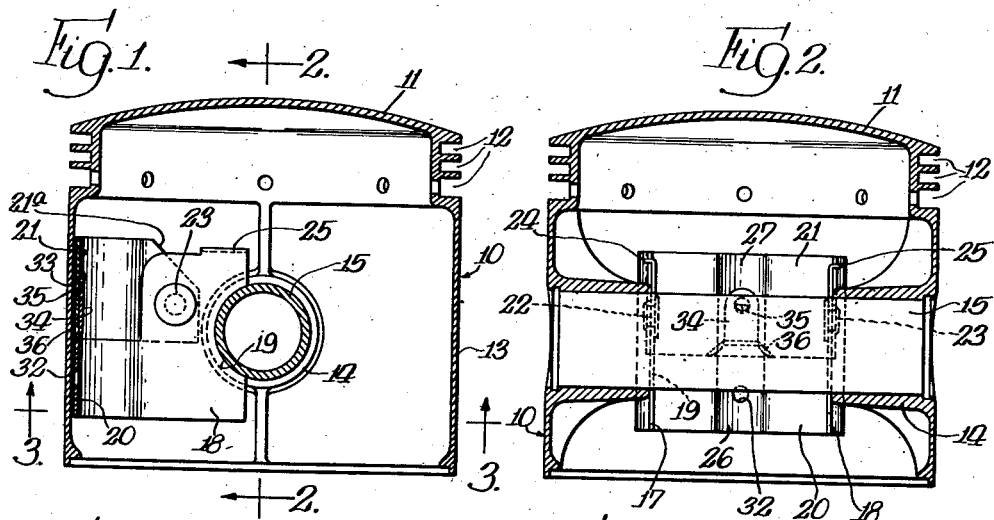
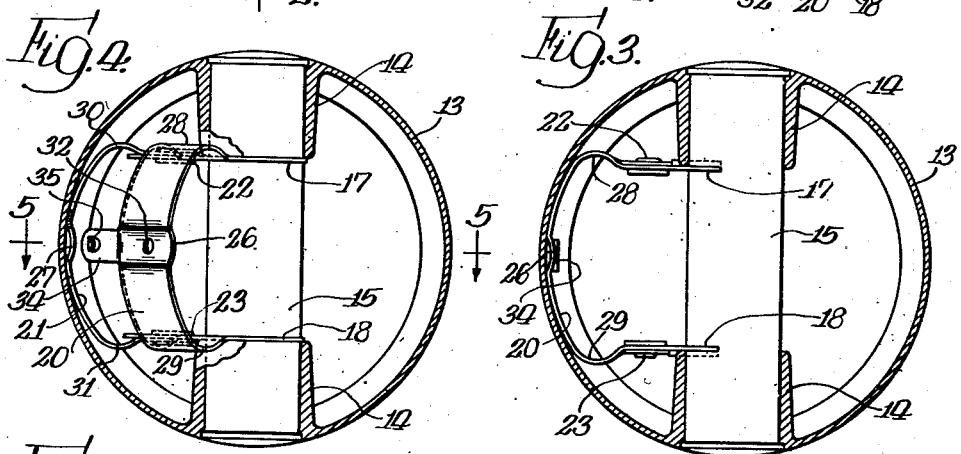
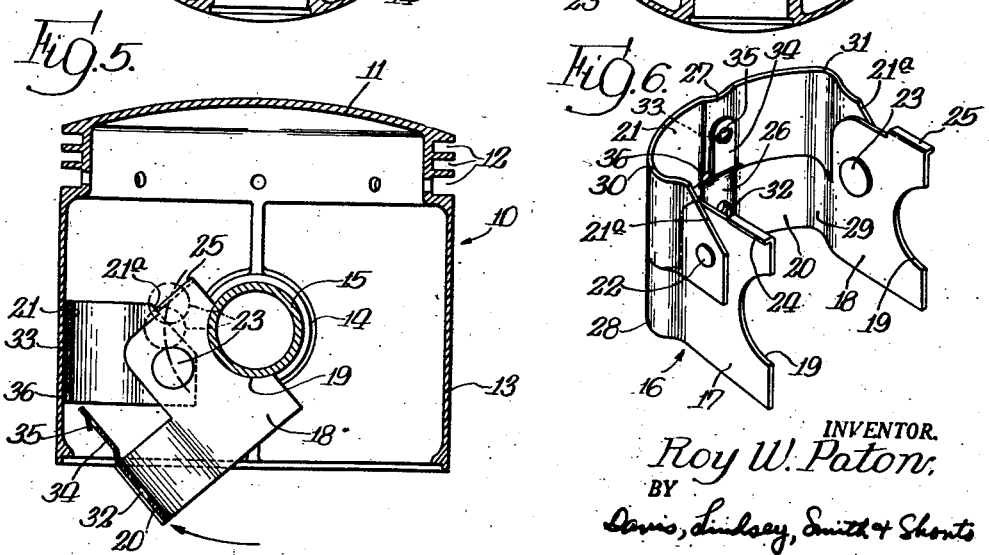
INVENTOR.
Roy W. Paton,
BY
Davis, Lindsey, Smith & Shonts
attys.

Patented May 30, 1944

2,350,064

UNITED STATES PATENT OFFICE 2,350,064

PISTON EXPANDER

Roy W. Paton, Hagerstown, Ind., assignor to The Perfect Circle Company, Hagerstown, Ind., a corporation of Indiana Application November 2, 1942, Serial No. 464,202

5 Claims. (Cl. 309—12)

This invention relates to piston expanders and more particularly to piston expanders adapted to expand the skirt of a piston of an internal combustion engine and the like to proper diameter for efficient operation.

Heretofore, various well-known types of one-piece resilient piston expanders have been provided for expanding the skirt of a piston to proper diameter in order to overcome the effect of wear or collapse of the piston skirt. However, installation of these various one-piece types in operative expanding position within the piston has been found to be quite difficult in that it has been necessary either to remove the piston pin, or to collapse or distort the expander when inserting it within the piston, or to slide the expander having the one-piece skirt bearing surface to operative position by the exertion of a considerable amount of pressure and effort to overcome the relatively great frictional resistance between its relatively large bearing surface and the piston skirt, all of which was tedious and time consuming and required considerable skill and the use of special tools. Also it has been found that such expanders which were so collapsed and plied with tools during installation may remain permanently distorted and sometimes failed to maintain themselves in operative position and to perform efficiently during engine operation; while other one-piece expanders of the type which were more easily inserted, because not constructed for a tight fit or for a close engagement with the interior piston projections, became loose and disengaged from the piston during engine operation.

One of the objects of my invention is to provide a highly efficient piston expander comprising a piston skirt-engaging surface comprising sections movable relatively to each other from open or non-expanding position to closed or operative piston-expanding position and which may be readily placed within a piston in open position and moved to closed piston-expanding position with a minimum of effort without the use of tools.

Still another object of my invention is to provide a piston skirt expander, having a relatively large piston skirt-engaging surface for efficient piston-expanding operation, comprising skirt-engaging sections movable relatively to each other and so constructed and arranged that the effect of the frictional resistance which occurs in moving the skirt-engaging sections to final operative piston-expanding position is reduced to a minimum for relatively easy and effortless installation.

A further object of my invention is to provide a piston skirt expander comprising two skirt-engaging sections pivotally and eccentrically mounted with respect to each other and relatively movable from open non-expanding position to closed expanding position by means of a toggle action with a minimum of effort.

A still further object of my invention is to provide an inexpensive, light, resilient piston expander which is capable of maintaining itself in operative piston-expanding position within a piston without loosening or becoming disengaged therefrom during engine operation.

Other and further objects and advantages will become apparent as this description progresses, reference being had to the accompanying drawing, in which:

Figure 1 is a vertical sectional view of an internal combustion engine piston with a piston pin mounted therein illustrating the improved piston skirt expander comprising my invention in operative piston-expanding position therein between the piston pin and the piston skirt;

Fig. 2 is a vertical sectional view of a piston and my improved piston skirt expander taken on the line 2—2 in Figure 1 looking in the direction of the arrows;

Fig. 3 is a horizontal sectional view taken on the line 3—3 in Figure 1 looking in the direction of the arrows upwardly into the interior of the piston;

Fig. 4 is a horizontal sectional view similar to Fig. 3 but illustrating my improved piston skirt expander in open inoperative position upon initial insertion into the piston and before being moved to closed piston-expanding position;

Fig. 5 is a vertical sectional view taken on the line 5—5 in Fig. 4 looking in the direction of the arrows; and Fig. 6 is a perspective view of the improved piston skirt expander comprising my invention locked in closed position.

The improved piston skirt expander comprising my invention has been illustrated in the drawing as applied to an internal combustion engine piston 10 of the usual type having a head 11 at its upper end and cylindrical side walls comprising a plurality of annular piston ring grooves 12 adjacent the head and a solid skirt 13 extending downwardly from the ring grooves 12. Extending inwardly from the inner periphery of the piston skirt 13 are opposed piston pin bosses 14 through which a piston pin 15 extends for operable connection to a connecting rod of the usual type (not shown). Although a solid skirt piston 10 has been illustrated in the drawing it is to be understood that my improved piston skirt expander is equally well adapted for application to other types of pistons including the split skirt type.

Specifically, as shown more particularly in Fig. 6 of the drawing, the piston skirt expander 16 comprising my invention comprises a generally channel-shaped and longitudinally extending shell formed of resilient metal which is adapted to be disposed longitudinally within the piston 10 with its longitudinal axis in parallel relation to the axis of the piston 10 and adapted to extend when in operative piston-expanding position between the piston pin 15 and the piston skirt 13. The outer ends or base portions 17 and 18 of the channel-shaped shell are each cut away as at 19 in a considerable arc forming thereby the outline of almost a complete semi-circle. The base portions 17 and 18 are adapted to engage the piston pin 15 adjacent the pin bosses 14, the pin 15 being received within the cutaway portions 19 and in engagement with the portions 17 and 18 at all points of the arc. This considerable arc of the cutaway portions 19 provides a definite and intimate engagement with the piston pin 15 and prevents inadvertent loosening of the piston expander 16 from operative piston-expanding position within the piston during engine operation. Although the base portions of the expander have been illustrated and described in engagement with the piston pin, it is to be understood that they may be constructed for engagement with the piston pin bosses or other suitable interior projections.

The piston skirt-engaging portion of the channel-shaped shell is split transversely to form two transverse channel-shaped skirt-engaging sections 20 and 21 which are adapted to be in substantial longitudinal alignment when in operative skirt-engaging position as shown in Fig. 1 of the drawing. The skirt-engaging section 20 is formed integrally with the base portions 17 and 18 while the skirt-engaging section 21 is pivotally and eccentrically mounted on the base portions 17 and 18 by means of rivets 22 and 23. These skirt-engaging sections 20 and 21 are, therefore, movable relatively to each other from open inoperative position to closed piston-expanding position, the relative opening movement of these sections 20 and 21 being limited by outwardly directed stop flanges 24 and 25 carried by the base portions 17 and 18, respectively, as shown best in Figs. 5 and 6, and adapted to engage the tapered end edges 21ᵃ of the transverse section 21.

The longitudinal dimension of the pivoted skirt-engaging section 21 is greater than that of the skirt-engaging section 20 to facilitate installation of the expander 16 to complete operative piston-expanding position, as will be more fully described hereinafter. Each of the skirt-engaging sections 20 and 21 is provided in its skirt-engaging surfaces with aligned and similarly shaped expansion formations or grooves 26 and 27, respectively, extending longitudinally of said sections 20 and 21, and with additional aligned and similarly shaped expansion formations or bulges 28 and 29, and 30 and 31, respectively, which extend laterally beyond and overhang the base portions 17 and 18. These expansion formations 26 and 27, 28 and 29, and 30 and 31 are adapted to increase the inherent resiliency of the expander 16 for more efficient piston expansion. The skirt-engaging sections 20 and 21 are also provided with apertures 32 and 33 which are centrally disposed in the expansion grooves 26 and 27 and serve to effectively locate the sections in the forming dies during manufacture. The aperture 33, however, has an additional function which will be described hereinafter.

In order to lock the skirt-engaging sections 20 and 21 together in operative expanding position and prevent their opening during engine operation, there is provided a latching means comprising a locking finger 34 which extends longitudinally as an integral part of section 20 from the expansion groove 26 thereof in a plane offset slightly downwardly therefrom. The locking finger 34 is provided adjacent its free end with a semi-circular hook or tongue 35 which may be punched upwardly out of the body portion of the finger 34 so as to slant in a direction toward the section 20. With the sections 20 and 21 in closed operative position the locking finger 34 underlies the expansion groove 27 of section 21 and its tongue 35 is received within the aperture 33 in the lower portion of the expansion groove 27, thereby preventing inadvertent relative opening movement of the sections 20 and 21. The section 21 is cutaway centrally at its inner edge as at 36 to eliminate interference of the section 21 with the locking finger 34 and permit full closing of the sections 20 and 21.

The piston skirt expander above described in detail may be readily and quickly installed in operable position in a piston by an operator of minimum mechanical skill with a minimum of effort without the use of tools and without removal of the piston pin 15. The first steps in making such installation are to set the expander 16 in fully open position with the stop flanges 24 and 25 in engagement with the tapered side edges 21ᵃ of section 21 and then place the opened expander 16 in initial position in the piston 10 with the base portions 17 and 18 in engagement with the piston pin 15 adjacent the pin bosses 14 and with the bearing surface of the pivoted transverse section 21 in complete engagement with the inner periphery of the piston skirt 13. In this initial stage of installation, the expander 16 assumes the position illustrated in Figs. 4 and 5 of the drawing with the pivoted transverse section 21 well up within the piston in engagement with the skirt and with the transverse section 20 extending downwardly and out of engagement with the piston skirt 13.

In the next and final step in the installation, the operator, using only his fingers and without any tools, may press against the end edges of the transverse section 20 and move the same upwardly in the direction of the arrow, as shown in Fig. 5, until the upstanding hook 35 of the locking finger 34 snaps into the aperture 33 of the section 21 locking the sections 20 and 21 together against relative opening movement. When this occurs, the piston expander 16 is completely closed and has been moved upwardly into final operative piston-expanding position illustrated in Figs. 1, 2 and 3. In this final closed and operative position, the transverse sections 20 and 21 are in abutting relation in substantial longitudinal alignment and both are in expanding engagement with the piston skirt 13.

During the above described final step, as the transverse bearing section 20 is being pushed upwardly to fully closed and operative position, the base portions 17 and 18 also move upwardly as they turn about the piston pin 15 so that the pivot points 22 and 23 move upwardly in an arcuate direction as shown by the broken lines in Fig. 5 to a point or plane above the center axis of the piston pin 15. Simultaneously, the upward movement of the pivot points 22 and 23 causes upward sliding movement in a direction axial of the piston 10 of the pivoted transverse section 21, as it bears against the piston skirt 13 until its final operative position against the upper portion of the inner periphery of the piston skirt 13 is attained, as shown in Fig. 1 of the drawing. The above described movement of the parts to operative and locked position wherein a relatively great expansive pressure is exerted by the expander, is accomplished through a toggle action effected by the exertion of a relatively low pressure by the operator.

From the foregoing it is apparent that my improved piston expander has many inherent advantages, particularly in the case of installation and efficiency in performance during engine operation. No frictional resistance occurs during installation between the other transverse skirt-bearing section 20 and the piston skirt 13 or between the locking finger 34 and the under surface of section 21 until immediately before the hook 35 of the locking finger 34 snaps into locking position in the aperture 33 of section 21, the frictional resistance not occurring until the final instant of installation due to the turning movement of section 20 which has a relatively small longitudinal dimension as compared to section 21 and to the offset construction of the locking finger 34. Thus, although my improved expander possesses a composite skirt-bearing surface that is relatively great in extent and therefore capable of efficiently performing its skirt-expanding function, it lacks the inherent difficulty of installation possessed by expanders having a one-piece skirt-bearing surface which normally can only be moved to operable position by the exertion of a relatively great amount of pressure and necessarily with the use of tools.

Another advantage resulting from the two-piece bearing surface of the expander is that the toggle movement of the parts is considerably reduced as compared to the relatively great extent of movement that would be necessary in the toggle action of an expander having a one-piece bearing surface to effect its movement to operative position. Also, by using one of the transverse pieces or bearing sections as the connecting piece between the base portions through which the toggle movement may be accomplished, double thicknesses of metal are avoided and the weight of the expander is materially reduced, thereby avoiding waste of basic materials and reducing production costs.

It will be understood that my invention is not limited to the details of construction described with reference to the drawing and that other forms may be used without departing from the spirit and scope of my invention as defined in the appended claims.

I claim:

1. A piston skirt expander in the form of a channel-shaped shell of resilient metal comprising two relatively movable piston skirt-engaging sections and base portions supporting said skirt-engaging sections and adapted to engage projection means within a piston, each section having a skirt engaging part, one part being superimposed and in alignment with the other part when in piston expanding position, and one of said skirt-engaging sections being rigidly connected to said base portions and the other of said skirt-engaging sections being pivotally and eccentrically mounted with respect to said base portions.

2. A piston skirt expander in the form of a channel-shaped shell of resilient metal comprising two transversely extending sections adapted to engage the inner periphery of a piston skirt and being movable relatively to each other from open inoperative position to closed piston-expanding position, and base portions supporting said transverse sections and adapted to engage surfaces within a piston, each section having a skirt engaging part, one part being superimposed and in alignment with the other part when in piston expanding position, and one of said sections being rigidly connected to said base portions and the other of said sections being pivotally and eccentrically mounted on said base portions.

3. A piston skirt expander in the form of a transversely split channel-shaped shell of resilient metal comprising two transversely extending sections adapted to engage the inner periphery of a piston skirt and being movable relatively to each other from open inoperative position to closed piston-expanding position, base portions supporting said transverse sections and adapted to engage projection means within a piston, each section having a skirt engaging part, one part being superimposed and in alignment with the other part when in piston expanding position, and one of said sections being pivotally and eccentrically mounted on said base portions and the other of said sections being rigidly connected to said base portions, and means for limiting relative opening movement of said transverse sections.

4. A piston skirt expander in the form of a channel-shaped shell of resilient metal comprising two relatively movable and transversely extending piston skirt-engaging sections and base portions supporting said skirt-engaging sections and being cut away at their side edges in a substantially semi-circular arc for engagement with a piston pin, the radius of said arc being substantially the same as that of the piston pin, each section having a skirt engaging part, one part being superimposed and in alignment with the other part when in piston expanding position, and one of said skirt-engaging sections being rigidly connected to said base portions and the other of said skirt-engaging sections being pivotally and eccentrically mounted on said base portions.

5. A piston skirt expander in the form of a channel-shaped shell of resilient metal comprising two transversely extending sections adapted to engage the inner periphery of a piston skirt and being movable relatively to each other from open inoperative position to closed piston-expanding position, base portions supporting said transverse sections and adapted to engage projection means within a piston, each section having a skirt engaging part, one part being superimposed and in alignment with the other part when in piston expanding position, one of said sections being rigidly connected to said base portions and the other of said sections being pivotally and eccentrically mounted on said base portions, and locking means for maintaining the transverse sections in closed operative position comprising a longitudinal extension carried by one of said sections and adapted to underlie the other of said sections when in closed position and elements between said extension and said other section adapted to be interlockingly engaged when said sections are in closed position.

ROY W. PATON.